(12) United States Patent
Rand

(10) Patent No.: US 7,273,114 B1
(45) Date of Patent: Sep. 25, 2007

(54) ELIMINATION OF JACK-KNIFING OF THE TRACTOR-TRAILERS

(76) Inventor: Jacob Sidney Rand, 155 E. 76th St., New York City, NY (US) 10021

(*) Notice: Subject to any disclaimer, the term of this patent is extended or adjusted under 35 U.S.C. 154(b) by 0 days.

(21) Appl. No.: 11/477,182

(22) Filed: Jun. 28, 2006

Related U.S. Application Data

(60) Provisional application No. 60/741,685, filed on Dec. 2, 2005.

(51) Int. Cl.
B62D 39/00 (2006.01)

(52) U.S. Cl. ............... 180/14.1; 280/33.991

(58) Field of Classification Search ......... 280/33.991, 280/445, 455.1, 460.1, 474, 482, 491.1, 491.2, 280/491.4, 432
See application file for complete search history.

(56) References Cited

U.S. PATENT DOCUMENTS

| | | | |
|---|---|---|---|
| 2,925,135 A | | 2/1960 | Hamilton |
| 3,411,600 A * | | 11/1968 | Loving et al. ............. 180/14.1 |
| 3,719,244 A * | | 3/1973 | Miller et al. ............. 180/14.1 |
| 3,889,770 A * | | 6/1975 | Herbert ............. 180/14.2 |
| 3,989,268 A | | 11/1976 | Rawn |
| 3,990,719 A | | 11/1976 | Wright |
| 4,025,085 A | | 5/1977 | Jacob |
| 4,065,148 A | | 12/1977 | Koroknay |
| 4,109,929 A | | 8/1978 | Koroknay |
| 4,133,552 A | | 1/1979 | Sheine |
| 4,161,329 A * | | 7/1979 | Pilz et al. ............. 280/474 |
| 4,361,342 A | | 11/1982 | Duffield |
| 4,368,793 A * | | 1/1983 | Igarashi ............. 180/14.4 |
| 4,385,772 A | | 5/1983 | Mackey |
| 4,645,226 A * | | 2/1987 | Gustavsson et al. ..... 280/476.1 |
| 4,775,165 A | | 10/1988 | Grovum |
| 4,784,403 A | | 11/1988 | Hawkins |
| 4,826,198 A | | 5/1989 | Herbert |
| 4,848,831 A | | 7/1989 | Buday |
| 5,108,144 A * | | 4/1992 | Crowley ............. 296/165 |
| 5,445,236 A * | | 8/1995 | Kuhn ............. 180/14.1 |
| 5,558,351 A | | 9/1996 | Hunter |
| 5,660,409 A | | 8/1997 | Hensley |
| 6,668,225 B2 | | 12/2003 | Oh et al. |
| 6,746,037 B1 | | 6/2004 | Kaplenski |

FOREIGN PATENT DOCUMENTS

DE 10144597 A1 * 3/2003

* cited by examiner

Primary Examiner—Christopher Bottorff
(74) Attorney, Agent, or Firm—Stanley H. Kremen

(57) ABSTRACT

A tractor-trailer coupling mechanism for a powered tow vehicle and unpowered trailer vehicle which eliminates jack-knifing. The coupling includes at least one extension or more on the trailer vehicle which is constructed to slide into a receptor channel or recesses in the powered vehicle. A locking or latching arrangement is attached at the front of the tractor vehicle. The result is that the tractor vehicle and the trailer vehicle are fixedly connected to each other as a single chassis vehicle, making the powered tractor vehicle and the trailer vehicle operate as one unit. An alternative arrangement would provide the channel on the trailer and the extension protruding from the powered tractor vehicle.

7 Claims, 3 Drawing Sheets

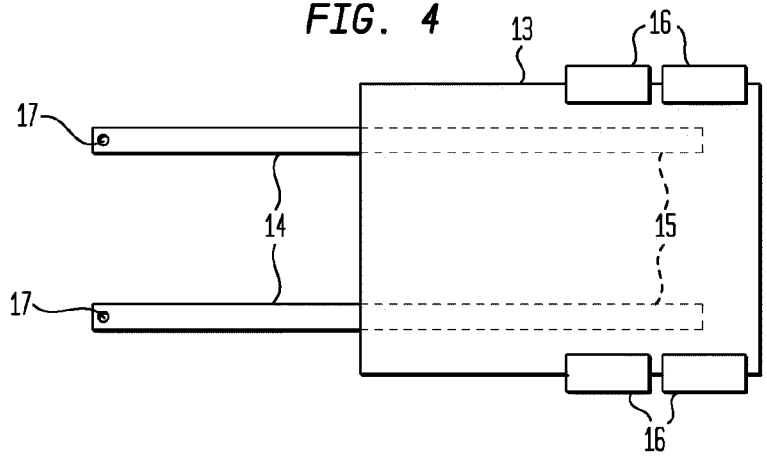
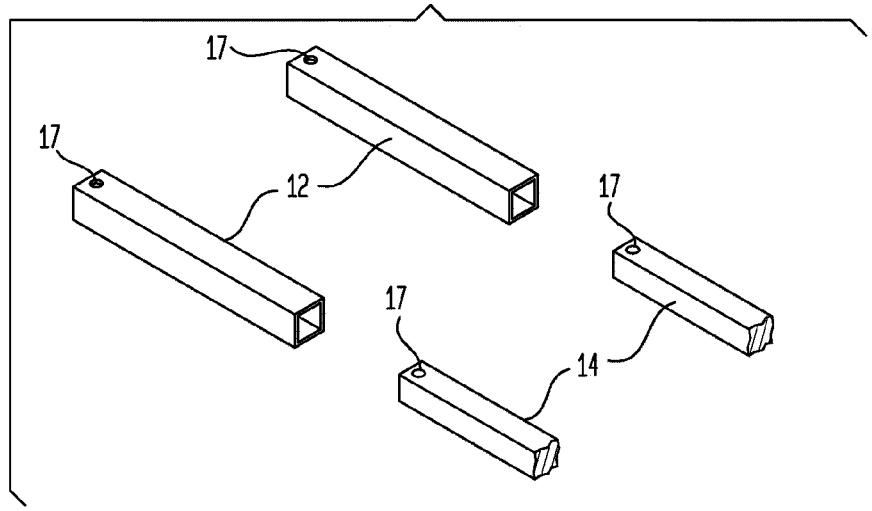
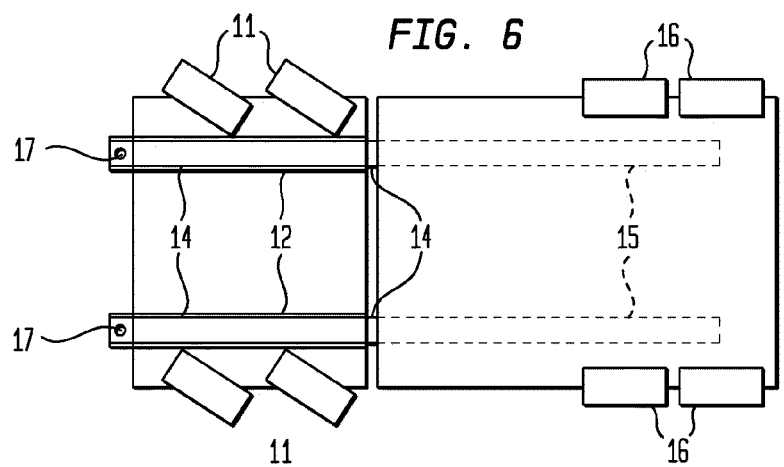

ELIMINATION OF JACK-KNIFING OF THE TRACTOR-TRAILERS

CROSS REFERENCE TO RELATED APPLICATIONS

The Present application is the non-provisional counterpart of U.S. Provisional Application Ser. No. 60/741,685 filed on Dec. 2, 2005. The Present application claims the benefit of and priority to said Provisional Application.

BACKGROUND OF THE INVENTION

1. The Problem to be Solved

Tractor-trailers are connected to each other by a conventional hitch so that there is angulation of motion and rotation between the tractor and the trailer. This configuration may produce trailer sway and jack-knifing which consequently may interfere with driver control. Consequently, accidents occur, resulting in property damage, personal injury, and loss of life.

There have been attempts in the prior art to limit mechanically the degree of rotation of the trailer relative to the tractor. However, these do not achieve total elimination of jack-knifing. A solution is needed so that the commercial trucker and recreational driver do not have to deal with this problem.

The Present Invention generally relates to elimination of jack-knifing of tractor-trailers, and specifically to the fixed hitch between the tractor and the trailer.

2. Discussion of the Prior Art

The following prior art presents examples of this attempt to limit the degree of hitch rotation, instability, sway, and jack-knifing between the tractor and the trailer; but none eliminate jack-knifing, trailer swing, or achieve the necessary degree of stability of the Present Invention.

U.S. Pat. No. 2,925,135 issued to Hamilton teaches a tractor vehicle having only two wheels, instead of four, and a third dolly wheel in the front middle which is lowered and utilized only when the tractor vehicle is detached from the trailer. However, the trailer is attached to the tractor vehicle by a relatively unstable prior art rotational hitch. This arrangement does not eliminate trailer swing and/or jack-knifing, in that there are two separate chassis arrangements joined together by a middle coupling. By contrast, the Present Invention provides trailer reinforcement rods terminating in front trailer extensions and receptor channels running through the length of the trailer vehicle so as to provide single chassis stability. In addition, in the Present Invention, the tractor vehicle is four-wheeled rather than two, with four-wheel drive power and four-wheel synchronized steering. Further, the third dolly wheel Hamilton is utilized only for stabilization of the tractor vehicle when it is detached from the trailer. By contrast, the Present Invention provides for a totally independent four wheel tractor vehicle when detached from the trailer. For commercial purposes, this independent tractor may be attached to another trailer, or for recreational purposes may be used as an ordinary passenger vehicle.

U.S. Pat. No. 4,784,403 issued to Hawkins discloses a conventional tractor-trailer arrangement of prior art with the added limitation of angular movement. However, Hawkins does not eliminate angular movement, trailer swing, or jack-knifing.

U.S. Pat. No. 6,746,037 issued to Kaplenski adds to the prior art by disclosing a variation of conventional rotational coupling.

U.S. Pat. No. 4,848,831 issued to Buday discloses a motor home assembly wherein connection of the tractor and trailer is by the rear tip of the chassis of the tow vehicle with the front tip of the chassis of the trailer secured by pins providing a relatively weak connection. By contrast, in the Present Invention, the tractor and trailer are connected so that the chassis extensions protruding from the front end of the trailer are so constructed that they can slide into the receptor channels of the chassis through the length of the tractor, rear to front, which essentially produces a firm single chassis vehicle. Further, the tow vehicle of Buday has front wheel drive. The Present Invention provides for a four-wheel drive powered vehicle and four-wheel synchronized steering.

SUMMARY OF THE INVENTION

The Present Invention joins a tractor to a trailer in such a manner that they both form a single chassis incapable of jack-knifing in that there is no longer a rotational, angulation hitch between them. This provides the following advantages over the prior art:

- it eliminates the rotational hitch between the tractor and the trailer which is the root-cause of jack-knifing and instability;
- it provides four-wheel tractor power drive as opposed to only rear axle tractor traction as in conventional prior art;
- it provides four-wheel tractor synchronized steering which does not appear in prior tractor-trailer art;
- it provides a plurality (preferably two) of receptor channels extending from the rear to the front of the tractor frame;
- it provides a conventional trailer vehicle with extensions protruding from its forward end that are able to slide within receptor channels in the tractor so as to be secured within these channels, thereby forming a single chassis vehicle;
- it provides anchoring of the trailer via reinforcement rods that terminate as extensions on the front and/or rear frame of the tractor such that the tractor and trailer become a single frame or single chassis vehicle, impervious to sway or jack-knifing; and,
- it provides a vehicle which is easier for a driver to handle and elimination of concern about jack-knifing.

As a result, the Present Invention affords a great contribution to highway safety and avoidance of accidents, thereby resulting in less property damage, less personal injury, and fewer deaths.

BRIEF DESCRIPTION OF THE DRAWINGS

FIG. 4 is a top plan view of the trailer.

FIG. 5 is an isometric exploded view showing the extensions and their corresponding receptor channels.

FIG. 6 is a top plan view of the Present Invention showing an example of four-wheel tractor synchronized steering.

GLOSSARY

In preparing this Present application, the Applicant intends to act as his own lexicographer. The definitions of terms in this section supersede the plain and ordinary meanings of those terms.

Tractor Vehicle—A powered vehicle comprising an engine, wherein said vehicle is able to tow a second vehicle. The cab portion of a truck is a tractor vehicle.

Trailer Vehicle—A vehicle under tow by another vehicle. This vehicle is normally not powered.

Tractor-Trailer—A combination vehicle of a tractor vehicle towing a trailer vehicle. Trucks are considered tractor-trailers.

Jack-Knifing—A condition of a tractor-trailer where the tractor and trailer vehicles suddenly face in directions substantially perpendicular to one another. This occurs in tractor-trailer vehicles where the trailer is attached to the tractor using a rotational hitch, and the vehicle turns sharply. When this happens, the tractor-trailer is unable to move further.

Sway—The inability of a vehicle to travel within its own highway lane.

Trailer Swing—The back-and-forth motion of the trailer in a direction other than the direction of travel.

Reinforcement Rod—A rod mounted in a tractor or trailer vehicle for the purpose of maintaining stability of the tractor-trailer combination.

Extension—That part of the reinforcement rod that protrudes from the vehicle.

Receptor Channel—A channel in the vehicle other than that comprising the reinforcement rods, into which said extensions may slide and to which said extensions may be secured.

Four Powered Wheels—This refers to what is commonly known as "all wheel drive." It either refers to a vehicle condition where both wheel axles are separately powered or where each wheel is separately powered.

Synchronized Steering—A mode of steering where the front wheels turn to steer the vehicle making a turn and where the rear wheels also turn to assist steering.

DETAILED DESCRIPTION OF THE INVENTION

Figure 1:
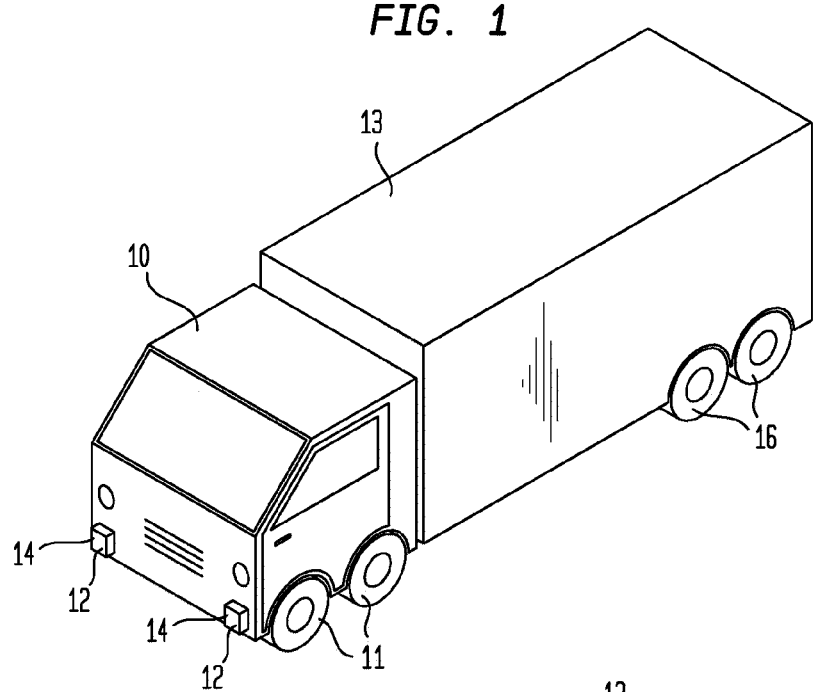
FIG. 1 is an isometric view of the tractor-trailer arrangement of the Present Invention.
Figure 2:
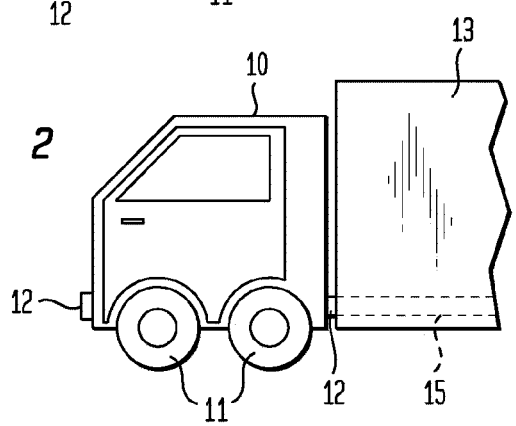
FIG. 2 is a partial left side elevational view of the tractor-trailer arrangement of the Present Invention.
Figure 3:
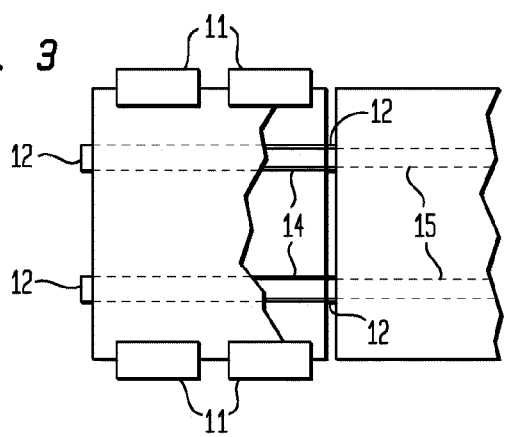
FIG. 3 is a partial top plan view of the tractor-trailer arrangement of the Present Invention.

Referring to FIG. 1, trailer vehicle 13 is attached to tractor vehicle 10 to form a single chassis unit. Tractor 10 has four powered wheels 11 with four-wheel drive and four-wheel synchronized steering. The trailer's rear wheels 16 are shown. The figure shows the trailer extensions 14 passing from the trailer to the front of the tractor within tractor receptor channels 12. FIG. 2 shows from the left side that the tractor receptor channels 12 pass through the tractor (front to rear) and mate with the trailer extensions. The figures show the trailer reinforcement rods in two (sections)—extension portion 14 extends through the tractor receptor channels to the front of the tractor vehicle, and reinforcement portion 15 resides within the trailer. Nonetheless, 14 and 15 form a single unitary reinforcement device of which there are two. FIG. 3 shows from the top that the trailer extensions 14 pass through the tractor receptor channels 12 from the back to the front of the tractor.

FIG. 4 is a top plan view showing the trailer 13 alone without the tractor. The rear wheels 16 are visible. Shown are the two trailer extensions extending from the trailer. Extension portions 14 extend from the trailer, while reinforcement portions 15 reside within the trailer chassis. FIG. 5 is an isometric view that indicates how the extensions 14 fit into receptor channels 12. In both figures, apertures 17 allow for insertion of pins, cable, chain, or alternative latching methods for securing the extensions to the receptor channels.

FIG. 6 is a top plan view of the tractor-trailer assembly of the Present Invention. Once again, note that extensions 14 extend through the entire tractor vehicle (rear to front) via tractor receptor channels 12. Apertures 17 allow securing the extensions 14 to the channels 12 at the front of the tractor vehicle. The figure also shows the four wheels 11 of the tractor in synchronized steering mode. In the figure, when the driver desires to steer the entire assembly to the right or to make a right turn, all for tractor wheels 11 turn to the right. Similarly, in synchronized steering mode, for a left turn, all four wheels would turn to the left.

Figure 7:
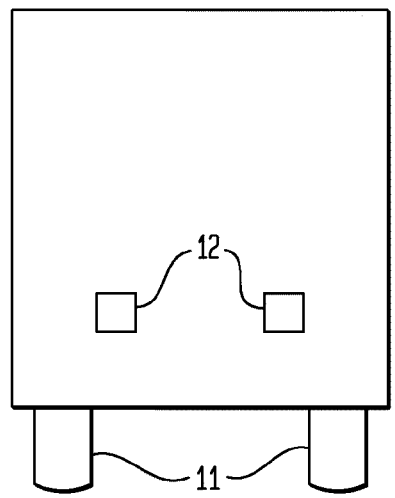
FIG. 7 is a rear elevational view of the tractor.
Figure 8:
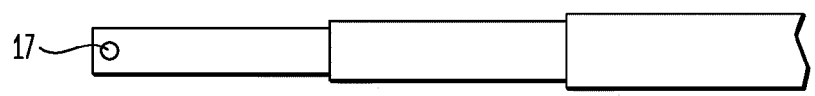
FIG. 8 shows an optional telescopic tractor extension.

FIG. 7 shows a rear elevational view of the tractor vehicle 10. The receptor channels 12 are shown as are the rear tractor wheels 11.

FIG. 4 shows the trailer extensions 14 extending from the trailer 13. As an alternate embodiment, reinforcement rod 15 can possess a telescoping structure wherein extension 14 may retract into reinforcement rod 15 when the tractor is not secured to the trailer.

Finally, as an alternate embodiment, the extension rods may protrude from the tractor, and the receptor channels may reside within the trailer.

What is claimed is:

1. A tractor-trailer combination comprising a tractor vehicle and a trailer vehicle, wherein:
   a) the trailer vehicle, having a length and a front end, comprises a plurality of reinforcement rods extending along the length of the trailer vehicle and protruding from the front end of the trailer vehicle as extensions of said reinforcement rods;
   b) the tractor vehicle, having a length, a rear end, and a front end, comprises the same plurality of receptor channels as the plurality of reinforcement rods;
   c) the receptor channels are positioned such that the extensions are able to slide into the corresponding receptor channels so as to join the tractor and trailer vehicles, thereby enabling the tractor-trailer combination to act as a single unitary vehicle;
   d) the receptor channels extend from the rear end of the tractor vehicle to the front end of the tractor vehicle;
   e) the extensions have a length greater than the length of the tractor vehicle, such that when the tractor and trailer vehicles are joined, the extensions protrude from the front end of the tractor vehicle through the receptor channels; and,
   f) the extensions and receptor channels comprise matching apertures or locking mechanisms that permit the extensions to be securely attached to the receptor channels.

2. The tractor-trailer combination of claim 1 wherein the number of the plurality is two.

3. The tractor-trailer combination of claim 1 wherein the apertures or mechanisms of the extensions and receptor channels permit the extensions to be securely attached to the receptor channels at the front end of the tractor vehicle.

4. The tractor-trailer combination of claim 1 wherein the tractor vehicle further comprises four powered wheels.

5. The tractor-trailer combination of claim 4 further comprising four-wheel synchronized steering.

6. The tractor-trailer combination of claim 1 wherein the extensions can retract into the reinforcement rods so as not to protrude from the front of the trailer vehicle when such protrusion is not desired.

7. The tractor-trailer combination of claim 1 wherein the reinforcement rods can be removably mounted to the trailer vehicle.

* * * * *